(12) United States Patent
Mcdonnell et al.

(10) Patent No.: US 11,162,478 B2
(45) Date of Patent: Nov. 2, 2021

(54) HYDRAULIC TRANSMISSION FOR A SMA ENGINE USED IN AN ENERGY RECOVERY DEVICE

(71) Applicant: Exergyn Limited, Dublin (IE)

(72) Inventors: Fintan Mcdonnell, Dublin (IE); Richard Blackburn, Ingleton (GB)

(73) Assignee: Exergyn Limited, Dublin (IE)

( * ) Notice: Subject to any disclaimer, the term of this patent is extended or adjusted under 35 U.S.C. 154(b) by 0 days.

(21) Appl. No.: 16/647,899

(22) PCT Filed: Sep. 18, 2018

(86) PCT No.: PCT/EP2018/075253
§ 371 (c)(1),
(2) Date: Mar. 17, 2020

(87) PCT Pub. No.: WO2019/053299
PCT Pub. Date: Mar. 21, 2019

(65) Prior Publication Data
US 2020/0256321 A1    Aug. 13, 2020

(30) Foreign Application Priority Data
Sep. 18, 2017   (GB) ...................................... 1714960

(51) Int. Cl.
*F03G 7/06*      (2006.01)
(52) U.S. Cl.
CPC .................................... *F03G 7/065* (2013.01)
(58) Field of Classification Search
CPC ............ F03G 7/065; G01K 5/483; G12B 1/00
See application file for complete search history.

(56) References Cited

U.S. PATENT DOCUMENTS

| | | | | |
|---|---|---|---|---|
| 4,955,196 A | * | 9/1990 | Lin | F03G 7/065 60/527 |
| 5,079,920 A | * | 1/1992 | Whitehead | F03G 7/065 60/527 |
| 7,052,251 B2 | * | 5/2006 | Nason | A61M 5/14244 417/321 |
| 9,810,340 B2 | * | 11/2017 | Kraus | F16K 31/025 |
| 2016/0138575 A1 | * | 5/2016 | Cullen | F03G 7/065 60/527 |
| 2016/0208783 A1 | * | 7/2016 | Cullen | F03G 7/065 |

FOREIGN PATENT DOCUMENTS

| | | |
|---|---|---|
| EP | 0709573 A1 | 5/1996 |
| WO | 2018/002182 A1 | 1/2018 |

* cited by examiner

*Primary Examiner* — Shafiq Mian
(74) *Attorney, Agent, or Firm* — Occhiuti & Rohlicek LLP

(57) ABSTRACT

The invention provides an energy recovery method and system comprising a first Shape-Memory Alloy (SMA) or Negative Thermal Expansion (NTE) core and adapted to convert movement of the core into energy in response to a change in temperature, and a fluid provides a temperature change to activate the first core, to generate a power stroke; and a back load is applied to the SMA core with a force higher than a maximum relaxation force of the SMA core. The advantage of the invention is to be able to allow a multistage variable loading regime on an SMA engine to increase the system efficiency. The invention provides a method of transferring large reciprocating forces into a steady rotary motion.

11 Claims, 4 Drawing Sheets

HYDRAULIC TRANSMISSION FOR A SMA ENGINE USED IN AN ENERGY RECOVERY DEVICE

CROSS REFERENCE TO RELATED APPLICATION

This application is the national phase under 35 USC 371 of international application no. PCT/EP2018/075253, filed Sep. 18, 2018, which claims the benefit of the Sep. 18, 2017 priority date of British application no. 1714960.0.

FIELD

The present application relates to the field of energy recovery and in particular to the use of Shape-memory alloys (SMAs) or Negative Thermal Expansion materials (NTE) for same.

BACKGROUND

Low-grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy is the use of Shape-memory Alloys.

A Shape-memory Alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of Shape-memory Alloys are the copper-zinc-aluminium-nickel, copper-aluminium-nickel, and nickel-titanium (NiTi) alloys but SMAs can also be created, for example, by alloying zinc, copper, gold and iron.

The memory of such materials has been employed or proposed since the early 1970's for use in heat recovery processes and in particular by constructing SMA engines which recover energy from heat as motion. Recent publications relating to energy recovery devices include PCT Patent Publication number WO2013/087490, assigned to the assignee of the present invention. It is desirable to translate the contraction of the SMA or NTE material into a mechanical force in an efficient manner. It is not a trivial task and generally is complicated and involves significant energy losses, as disclosed in patent publication numbers DE3014560 and US2008/034750. US patent publication number US2016/138575 and U.S. Pat. No. 5,079,920 discloses the option of having a simple hydraulic system to harvest the output of a SMA material. PCT Patent publication number WO2018/002182 discusses a solution in which a low pressure accumulator can prevent the over-stressing of SMA wires when they are not ready to be subjected to the full force developed by a hydraulic system, which in effect provides a protection mechanism to allow the SMA wires to have a long fatigue life.

A problem with the systems disclosed is that it is very difficult to transfer large reciprocating forces from contraction/expansion of the SMA or NTE material into steady rotary motion.

It is therefore an object to provide an improved system and method in an energy recovery device.

SUMMARY

According to the invention there is provided, as set out in the appended claims, an energy recovery system comprising:
a first Shape-Memory Alloy (SMA) or Negative Thermal Expansion (NTE) core and adapted to convert movement of the core into energy in response to a change in temperature, and a fluid provides a temperature change to activate the first core, to generate a power stroke; and
a back load is applied to the SMA core with a force higher than a maximum relaxation force of the SMA core.

The advantage of the invention is to be able to allow a multistage variable loading regime on a SMA core or engine to increase the system efficiency. The system provides a method of transferring large reciprocating forces into a steady rotary motion.

The backload on the SMA is generated by the electrical load demand put on the generator which transfers into a hydraulic system, through a hydraulic motor for example. This can be enabled using a power pack system. The key function of the power pack is to create a minimum relaxation pressure for resetting the core or engine, replenish lost fluids, through a series of valves and keep the oil healthy through cleaning and cooling.

In one embodiment during a relaxation stage of a cycle the back load is applied from a hydraulics transmission.

In one embodiment the hydraulics transmission is configured to provide a base load for a certain time frame and after said time frame has passed; the transmission is configured to provide an increasing load over another set time frame to match a back pressure from the straining SMA material.

In one embodiment a plurality of check valves are configured to create a unidirectional main drive circuit for the fluid flow.

In one embodiment a hydraulic motor is configured to transfer the energy gained from the SMA core to be transferred to a generator.

In one embodiment a low pressure side adapted to provide loading to the core and a high pressure side which takes the flow with the energy gained to a generator.

In one embodiment reciprocating motion of the power stroke is smoothed out through the use of at least one accumulator.

In on embodiment a steady flow rate through a motor is provided and allows the motor to operate at a speed which suits a higher efficiency output.

In one embodiment there is provided an inlet and outlet for receiving and discharging fluid from a core to define a mixing chamber area.

In one embodiment if the temperature of the fluid in the mixing chamber area is maintained inside a hysteresis curve the fluid can perform a preheating or a precooling stage of the wires.

In one embodiment the core comprises a plurality of Shape-Memory Alloy (SMA) or Negative Thermal Expansion (NTE) elongated wires. The plurality of wires can be referred to as a bundle.

In one embodiment at least one of the cores cooperates with a piston.

In another embodiment there is provided a method of energy recovery in a system comprising a first Shape- Memory Alloy (SMA) or Negative Thermal Expansion (NTE) core comprising the steps of:

converting movement of the core into energy in response to a change in temperature;

using a fluid to provide a temperature change to activate the first core, to generate a power stroke; and applying a back load to the SMA core with a force higher than a maximum relaxation force of the SMA core during operation.

In another embodiment there is provided energy recovery system comprising:

a first Shape-Memory Alloy (SMA) or Negative Thermal Expansion (NTE) core and adapted to convert movement of the core into energy in response to a change in temperature, and a fluid is configured to communicate with the first core to provide a temperature change to cyclically activate the first core, and generate a power stroke; and a hydraulics transmission module is configured to apply a back load to the core with a force higher than a maximum relaxation force of the core by applying a base load for a certain time frame, and after said time frame has passed the transmission module is configured to provide an increasing load over another set time frame to match a back pressure when the SMA material in the core is straining.

In a further embodiment there is provided method of energy recovery in a system comprising a first Shape-Memory Alloy (SMA) or Negative Thermal Expansion (NTE) core comprising the steps of:

converting movement of the core into energy in response to a change in temperature;

using a fluid to provide a temperature change to activate the first core, to generate a power stroke; and applying a back load to the core with a force higher than a maximum relaxation force of the core by applying a base load for a certain time frame, and after said time frame has passed the transmission module is configured to provide an increasing load over another set time frame to match a back pressure when the SMA material in the core is straining.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The invention relates to a heat recovery system under development which can use either Shape-Memory Alloys (SMAs) or Negative Thermal Expansion materials (NTE) to generate power from low-grade heat.

Figure 1:
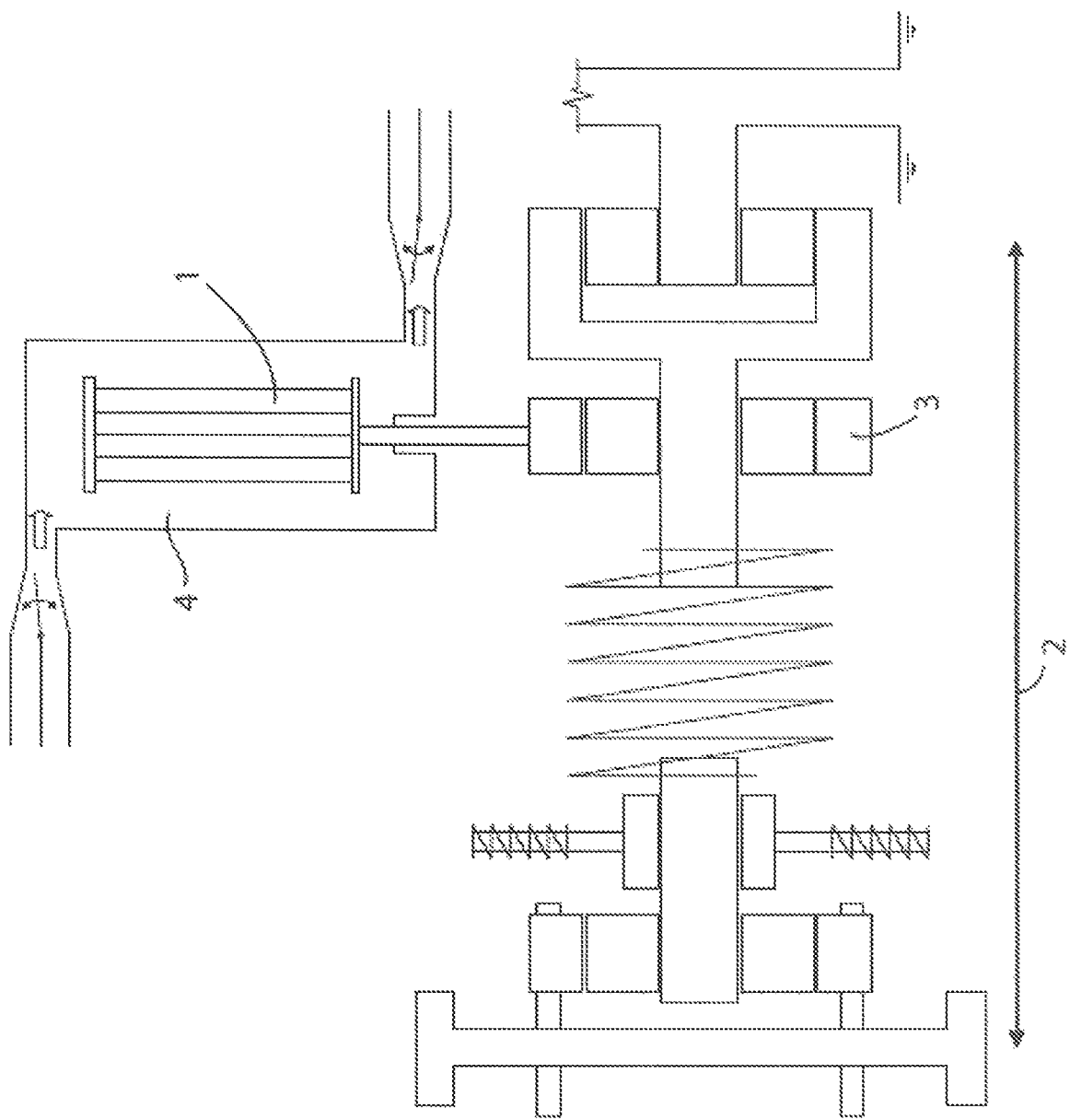
FIG. 1 illustrates a known energy recovery system.

An exemplary known embodiment of an energy recovery device will now be described with reference to FIG. 1 which provides an energy recovery device employing a SMA engine indicated by reference numeral 1. The SMA engine 1 comprises an SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3, generating a power stroke. An immersion chamber 4 is adapted for housing the SMA engine and the chamber is adapted to be sequentially filled with fluids, at different temperatures, to allow heating and/or cooling of the SMA engine. Fluid can enter the top of the chamber 4 in the direction of the error and exit via an outlet near the bottom of the chamber 4. Accordingly, as heat is applied to the SMA core it is free to contract. Suitably, the SMA core comprises a plurality of parallel wires, ribbons or sheets of SMA material. It will be appreciated that in the context of the present invention the term 'wire' is used and should be given a broad interpretation to mean any suitable length of SMA or NTE material that can act as a core.

Typically, a deflection in and around 4% is common for such a core. Accordingly, when a 1 m length of SMA material is employed, one might expect a linear movement of approximately 4 cm to be available. It will be appreciated that the force that is provided depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention.

Force is generated through the contraction and expansion of the SMA material, presented as a plurality of wires (or bundle), within the working core, via a piston and transmission mechanism. Accordingly, depending on the requirements of a particular configuration and the mass of SMA material needed a plurality of SMA wires may be employed together, spaced substantially parallel to each other, to form a single core.

It is desirable to transfer large reciprocating forces from contraction/expansion of the SMA or NTE material into steady rotary motion.

In one embodiment the invention provides a multistage variable loading regime on an SMA engine to increase the system efficiency. A method of transferring large reciprocating forces into a steady rotary motion is now described with reference to FIG. 2. The system provides a variable loading regime to bundles of SMA (Shape Memory Alloy) wires in a SMA engine or core.

During the relaxation stage of a cycle a hydraulics transmission module is adapted to apply a multistage loading. The pattern includes a base load for a certain time frame and after the time frame has passed; the transmission should be able to provide an increasing load over another set time frame to match the back pressure from the straining SMA material. The design can allow for varying time frames.

On the power stroke from the engine, a back load is applied to the SMA material with a force higher than the maximum relaxation force. The energy gain in the transmission generated from the SMA can then be transferred to a generator.

Figure 2:
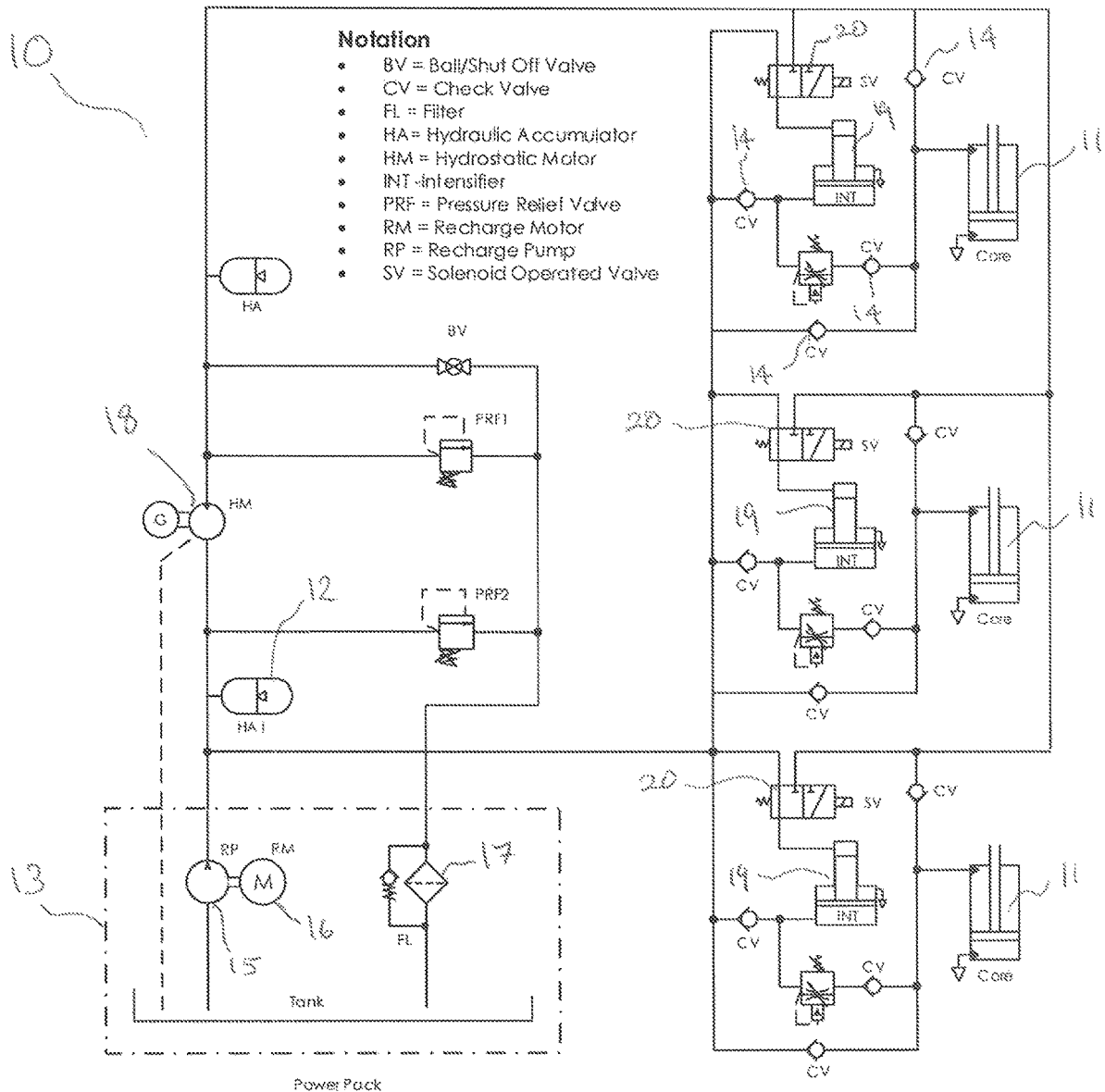
FIG. 2 illustrates a first embodiment of the invention showing a basic schematic of an energy recovery system.

As shown in FIG. 2 illustrates a basic schematic of a circuit 10 showing a number of cores 11 connected to a hydraulic system 12 and a power pack system 13. The functionality of the control valves 14 in a manifold supply the hot and cold water to the SMA engine 11 to provide a controlled temperature change to provide expansion and contraction of the SMA engine 11 to generate a power stroke for power generation.

The power pack system 13 comprises a tank, an electric motor 16, and pump 15 and filtration circuit 17 which provides the minimum loading on the SMA material for the initial relaxation phase and allows a minimum flow to run through a filter and cooler for oil conditioning.

A series of check valves 14 can be used to create a unidirectional main drive circuit for the fluid flow and a hydraulic motor 18 is used in this circuit to transfer the energy gained in the circuit from the SMA to be transferred to the generator. This circuit is then split down into two key sections. A low pressure side which supplies the cores and a high pressure side which takes the flow with the energy gain to the motor and generator.

To supply an increasing pressure regime for the second phase of the relaxation stroke, an intensifier 19 can be incorporated to take a small amount of flow from the high side of the main drive circuit to boost the pressure on a stored amount of oil volume taken from the low side and pump it into a piston which is loading the SMA engine. The flow and pressure into the piston is regulated through a pilot operated valve. The activation time frames is dictated by solenoid valves 20.

The reciprocating motion of the pistons is smoothed out through the use of accumulator 12s which facilitates a steady flow rate through the motor and allows the generator and motor to operate at a speed which suits a higher efficiency output.

The fluid delivery system valve operation can be operated by additional solenoids and variable flow restrictors.

In one embodiment a cascade arrangement involves the serial connection of cores such that water flowing from the outlet of one core can be sent to the inlet of another core.

Figure 3:
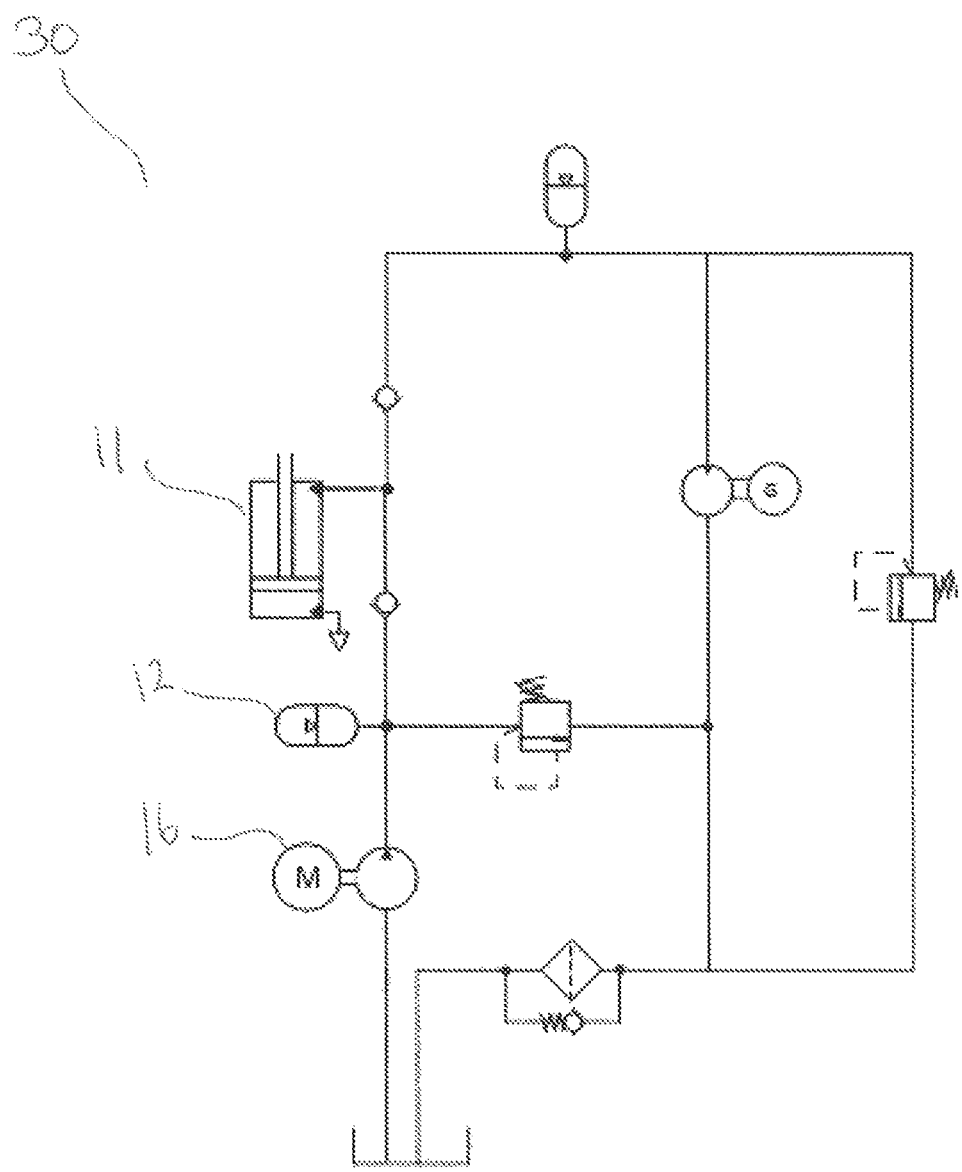
FIG. 3 illustrates a hydraulic circuit according to a second embodiment run in a configuration shown in FIG. 1.

FIG. 3 illustrates how the hydraulic circuit can run in a basic configuration indicated by the reference numeral 30 and uses the same reference numerals as FIG. 2 for common elements. This circuit 30 pumps a low pressure volume of oil into the core and when the cores are activated, the piston will increase the pressure in the actuator to pump it out through a check valve system and into the motor. This creates a pressure differential between the inlet of the motor and the outlet going to the tank. This differential creates a torque on the motor shaft which can then be used to turn a generator.

Figure 4:
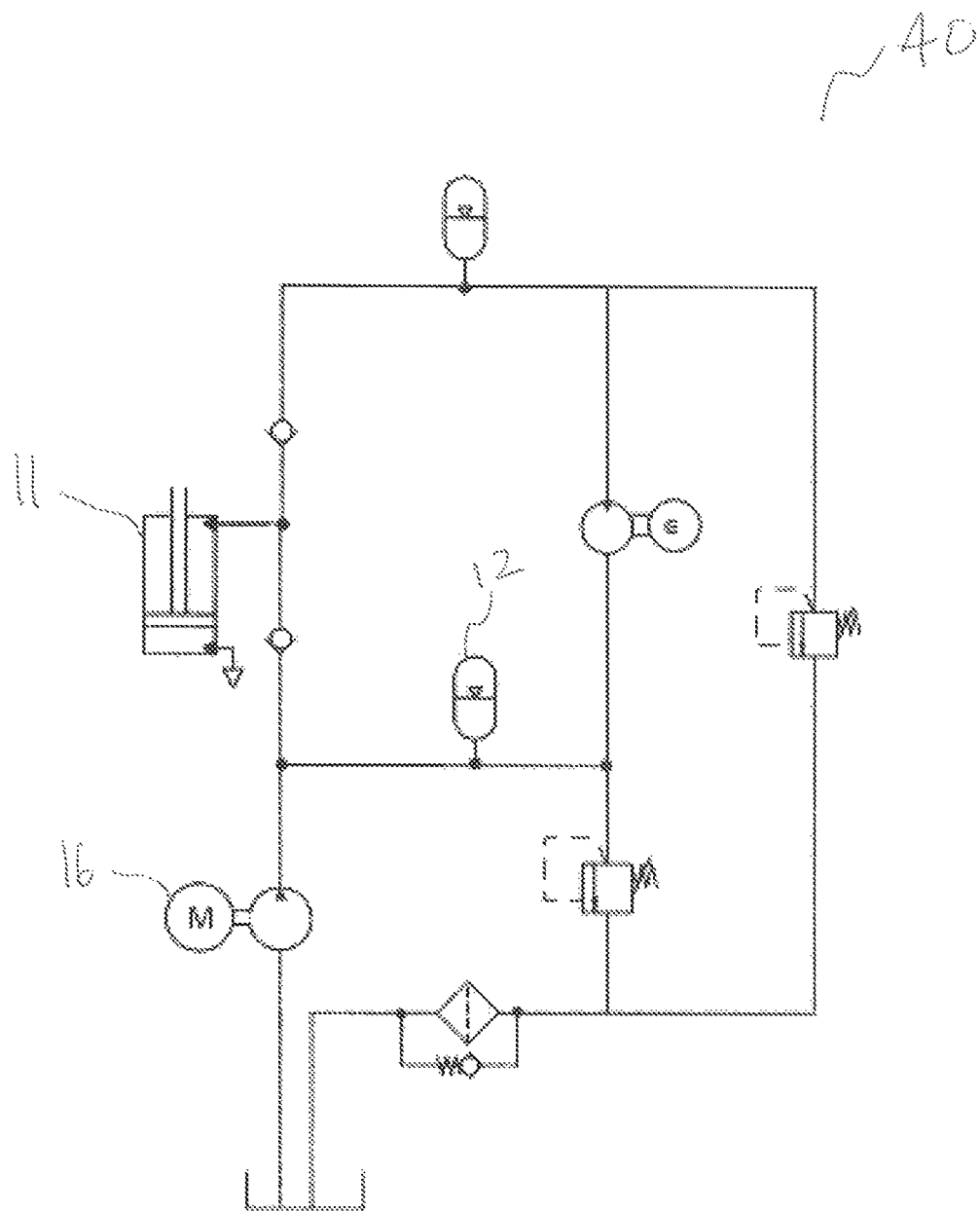
FIG. 4 illustrates a hydraulic circuit according to a third embodiment of the invention and a variation of FIG. 2 operating in a closed loop system.

FIG. 4 illustrates a variation of the embodiment shown in FIG. 3 where the circuit can be converted into a closed loop system, indicated by the reference numeral 40. The outlet of the motor does not drop the pressure back to atmospheric in the tank but rather matches the low pressure being pumped into the cores. This reduces the pressure drop across the motor but also reduces the flow rate that needs to be pumped in from the tank. The system subsequently has less power out at the motor shaft but a reduced parasitic load on the pump. The low-pressure pump will serve to keep a minimum low pressure on the cores and send the minimum amount of fluid through a filtration or cooling system to ensure the oil remains in good condition. It will also replace any losses through the relief valves. This flow rate is typically a lot less than the main driveline flow being pumped from the core actuators and therefore creates a net gain in power output across the full system.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy-recovery system comprising:
a core, a fluid, and a hydraulics transmission module,
wherein the core comprises a material selected from the group consisting of shape-memory alloy and negative-thermal-expansion material,
wherein the energy-recovery system is adapted to convert movement of the core into energy in response to a change in temperature and to generate a power stroke,
wherein the fluid is configured to communicate with the core to provide a temperature change to cyclically activate the core, and
wherein the hydraulics transmission module is configured to apply a back load to the core with a force higher than a maximum relaxation force of the core by applying a base load for a certain time frame, and after said time frame has passed, to provide an increasing load over another set time frame to match a back pressure when the material in the core is straining, and wherein, during a relaxation stage of a cycle, the back load is applied from the hydraulics transmission module.

2. The energy-recovery system as claimed in claim 1, wherein a plurality of check valves are configured to create a unidirectional main drive circuit for the fluid to flow.

3. The energy-recovery system as claimed in claim 1, wherein a hydraulic motor is configured to transfer the energy gained from the core to a generator.

4. The energy-recovery system as claimed in claim 1, said system further comprising a low-pressure side adapted to provide loading to the core and a high-pressure side that which takes the flow with the energy gained to a generator.

5. An energy-recovery system comprising:
a core, a fluid, and a hydraulics transmission module,
wherein the core comprises a material selected from the group consisting of shape-memory alloy and negative-thermal-expansion material,
wherein the energy-recovery system is adapted to convert movement of the core into energy in response to a change in temperature and to generate a power stroke,
wherein the fluid is configured to communicate with the core to provide a temperature change to cyclically activate the core,
wherein the hydraulics transmission module is configured to apply a back load to the core with a force higher than a maximum relaxation force of the core by applying a base load for a certain time frame, and after said time frame has passed, to provide an increasing load over another set time frame to match a back pressure when the material in the core is straining, and
wherein reciprocating motion of the power stroke is configured to be smoothed out through the use of at least one accumulator.

6. The energy-recovery system as claimed in claim 1, wherein a steady flow rate through a motor is provided through active pressure control.

7. The energy-recovery system as claimed in claim 1, wherein the core comprises a plurality of Shape-Memory Alloy (SMA) or Negative Thermal Expansion (NTE) elongated wires arranged in parallel with each other.

8. A method of energy recovery in a system comprising a core that comprises a material selected from the group consisting of a first Shape-Memory Alloy (SMA) or Negative Thermal Expansion (NTE) material, the method comprising the steps of:
   converting movement of the core into energy in response to a change in temperature;
   using a fluid to provide a temperature change to activate the first core to generate a power stroke; and
   using a hydraulic transmission module to apply a back load to the core with a force higher than a maximum relaxation force of the core by applying a base load for a certain time frame and, after said time frame has passed, to provide an increasing load over another set time frame to match a back pressure when the SMA material in the core is straining.

9. The energy-recovery system as claimed in claim 1, further comprising an intensifier that receives flow from a high-pressure to boost pressure at the low-pressure side.

10. The energy-recovery system as claimed in claim 1, further comprising a low-pressure side adapted to provide loading to the core and a high-pressure side, wherein flow at said high-pressure side is provided to a motor that creates an optimized pressure difference during a core cycle.

11. The energy-recovery system as claimed in claim 1, further comprising a low-pressure side adapted to provide loading to the core and a high-pressure side, wherein flow at said high-pressure side has higher energy as a result of having sustained an increase in pressure, wherein said flow is provided to said low-pressure side.

* * * * *